United States Patent [19]

Suzuki et al.

[11] Patent Number: 4,820,796
[45] Date of Patent: Apr. 11, 1989

[54] TRANSPARENT POLYAMIDE ELASTOMER FROM CARBOXY POLYCAPROLACTAM AND POLY(TETRAMETHYLENE OXY)GLYCOL

[75] Inventors: Yoshio Suzuki; Mikihiko Nakamura, both of Fuji; Atsushi Aoshima, Yokohama, all of Japan

[73] Assignee: Asahi Kasei Kogyo Kabushiki Kaisha, Osaka, Japan

[21] Appl. No.: 1,657

[22] PCT Filed: Apr. 25, 1986

[86] PCT No.: PCT/JP86/00209

§ 371 Date: Dec. 15, 1986

§ 102(e) Date: Dec. 15, 1986

[87] PCT Pub. No.: WO86/06390

PCT Pub. Date: Nov. 6, 1986

[30] Foreign Application Priority Data

Apr. 26, 1985 [JP] Japan .................. 60-88873
Jun. 5, 1985 [JP] Japan .................. 60-120599
Sep. 25, 1985 [JP] Japan .................. 60-210175
Oct. 30, 1985 [JP] Japan .................. 60-241271

[51] Int. Cl.$^4$ ............................ C08G 69/44
[52] U.S. Cl. .................... 528/292; 525/420; 528/300
[58] Field of Search .......... 528/292, 300; 525/420

[56] References Cited

U.S. PATENT DOCUMENTS

| | | | |
|---|---|---|---|
| 4,208,493 | 6/1980 | Deleens et al. | 528/292 |
| 4,332,920 | 6/1982 | Foy et al. | 528/408 |
| 4,345,052 | 8/1982 | Mumcu et al. | 525/420 |
| 4,345,064 | 8/1982 | Mumcu | 528/392 |
| 4,349,661 | 9/1982 | Mumcu | 528/392 |
| 4,429,081 | 1/1984 | Mumco et al. | 525/420 |
| 4,483,975 | 11/1984 | deJong et al. | 525/420 |
| 4,536,563 | 8/1985 | Okitsu et al. | 528/292 |

FOREIGN PATENT DOCUMENTS 210925 12/1983 Japan .

*Primary Examiner*—Harold D. Anderson
*Attorney, Agent, or Firm*—Birch, Stewart, Kolasch & Birch

[57] ABSTRACT

A polyamide elastomer having a structure of dehydration condensate between
(A) a polycapramide having a number average molecular weight of 500-5,000 and having carboxyl end groups, which is derived from caprolactam and a dicarboxylic acid having 4-20 carbon atoms selected from aliphatic dicarboxylic acids, alicyclic dicarboxylic acids and aromatic dicarboxylic acids and (B) a polyoxytetramethylene glycol having a number average molecular weight of 800-5,000 or a modified polyoxytetramethylene glycol having a number average molecular weight of 800-5,000 and having, in the molecular chain, the units represented by the general formula

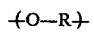

wherein R is a branched chain alkylene group having 4-20 carbon atoms or a straight chain alkylene group having 5-20 carbon atoms, the units content being 50% by weight or a less; the weight ratio of the component (A) to the component (B) being from 10:90 to 60:40. The said elastomer has a relative viscosity of 1.5 or above in m-cresol (0.5 weight/volume %) at 30° C., a polyamide partition ratio of 0.7-1.3, a Shore hardness of 60 A-50 D, a tensile strength of 150 kg/cm$^2$ or above, and a cloudiness (haze value) of 75% or below. The elastomer is advantageously usable in hose, tube and the like. The disclosure also includes process for producing such an elastomer.

31 Claims, 1 Drawing Sheet

TRANSPARENT POLYAMIDE ELASTOMER FROM CARBOXY POLYCAPROLACTAM AND POLY(TETRAMETHYLENE OXY)GLYCOL

TECHNICAL FIELD

The present invention relates to a transparent polyamide elastomer. More particularly, the present invention relates to a transparent polyamide elastomer of the polyether-ester-amide type which is composed of polycapramide as the hard segment and polyoxytetramethylene glycol as the soft segment and has a low hardness belonging to crosslinked rubber and a high strength so that it is preferably used in the field particularly requiring flexibility and transparency such as hoses, tubes, films and sheetings.

BACKGROUND ART

In recent years, thermoplastic elastomers such as polyamide elastomers and polyester elastomers have begun to come rapidly into use, for example, in mechanical parts, sheetings, and hoses, because of their excellence in physical properties such as water resistance, heat resistance, mechanical strength, and low temperature characteristics and also in moldability promising an improvement in productivity.

Of the thermoplastic elastomers, known polyamide elastomers include a polyether-ester-amide type and a polyether-amide type. In both types, nylons such as 12-nylon and 6-nylon are used as the polyamide constituent, the former nylon being chiefly used in commercial products. On the other hand, as the polyether constituent, use may be made of polyoxyethylene glycol, polyoxypropylene glycol, polyoxytetramethylene glycol, mixtures thereof, or block copolymers thereof. Of these compounds, polyoxytetramethylene glycol is chiefly used in view of water resistance, mechanical strength, and low temperature characteristics.

Elastomers having such physical properties as flexibility, high mechanical strength, and transparency are preferably employed as useful industrial materials such as, for example, sheetings, films, and tubings. However, because of being mainly of the 12-nylon type which is relatively good in the miscibility between the hard segment and the soft segment, the polyamide elastomers currently being on the market have a relatively high Shore hardness of 40D to 70D. A soft nylon elastomer having a Shore hardness of 60A to 40D, as in the case of crosslinked rubbers, has not yet been known.

In order to decrease the hardness of the elastomer, it is a common practice to reduce the content of polyamide constituting the hard segment. If it is attempted in such a manner to prepare an elastomer of the 12-nylon type, the cohesive force in the polyamide domain will be rapidly decreased, thereby forming a product of a low mechanical strength or of a low melting point and, hence, a product having low heat resistance. If 6-nylon is used in the hard segment, it seems probable to obtain a tough product owing to a large cohesive force in the hard domain even in the case of a low 6-nylon content. However, in preparing an elastomer having a hard segment of 6-nylon and a soft segment of polyoxytetramethylene glycol, the low miscibility between the two materials tends to cause a coarse phase separation during polymerization, forming a polymerization system of milky white appearance and the resulting polyamide elastomer becomes opaque and pale yellowish white in color accompanied with reduced mechanical strengths. This tendency becomes more marked with increased number average molecular weights of polyoxytetramethylene glycol. When the number average molecular weight of polyoxytetramethylene glycol is 800 or below, an elastomer formed which is opaque but has a relatively high strength. However, owing to the low molecular weight of the polyoxytetramethylene glycol, the resulting elastomer is very limited in composition, thus making it difficult to obtain a product of well-balanced physical properties. When the number average molecular weight of polyoxytetramethylene glycol is 1,000 or above, there is formed only an elastomer which is of low strength and the elastomer is fragile. For this reason, a polyamide elastomer having a hard segment of 6-nylon and a soft segment of polyoxytetramethylene glycol has not yet been put to practice Such an elastomer is separated into a soluble portion and an insoluble portion by dissolving, the elastomer in a concentration of 40 to 60%, in a solvent such as a methanol-chloroform mixed solvent and the weight ratio (hereinafter referred to as 'polyamide partition' ratio) of the polyamide content of soluble portion to insoluble portion is determined from the weight ratio of the tetramethylene oxide unit to the aminocaproic acid unit estimated from $H^1$-NMR. The polyamide partition ratio thus obtained is approximately 0.5 or below, indicating that the elastomer is a mixture of an elastomer of lower polyamide content and an elastomer of higher polyamide content Such heterogeneity in the composition is the cause of opacity and inferior mechanical strength.

There have been proposed polyamide elastomers composed of polyoxytetramethylene glycol as the polyether constituent such as, for example, an elastomer employing, as the hard segment, a polyamide having 4 to 14 carbon atoms between amide groups (U.S. Pat. No. 4,230,838, U.S. Pat. No. 4,331,786 and U.S. Pat. No. 4,332,920), an elastomer employing, as the hard segment, a polyamide having 9 or more carbon atoms between amide groups (U.S. Pat. No. 4,207,410), and an elastomer employing, as the hard segment, a polyamide having 5 to 19 carbon atoms between amide groups, which is derived from an aminocarboxylic acid (U.S. Pat. No. 4,376,856). Most of the disclosed polyamide elastomers employ, as the hard segment, 12-nylon or 11-nylon and few employ 6-nylon as the hard segment. Moreover, the polyoxytetramethylene glycols used in polyamide elastomers employ 6-nylon as the hard segment have mostly a number average molecular weight of 600 to 800. All of such elastomers cannot be said to be excellent with respect to any of flexibility, toughness and transparency. The actual circumstances are such that there has been found no polyamide elastomer which is excellent in all of such physical properties as flexibility, toughness and transparency.

SUMMARY OF THE INVENTION (a) Problems to be Solved by the present Invention

An object of the present invention under the above circumstances is to provide a polyamide elastomer of the polyether-ester-amide type having a low hardness belonging to crosslinked rubber, high strength and, in addition, transparency, said polyamide elastomer comprising polycapramide as the hard segment and polyoxytetramethylene glycol as the soft segment.

(b) Means of Solving the Problems

The present inventors conducted an extensive study and, as a result, found that the above object can be achieved by a polyamide elastomer which is a block copolymer comprising, as the hard segment, a polycapramide with carboxyl end groups and having a specified number average molecular weight and, as the soft segment, a polyoxytetramethylene glycol having a specified molecular weight (a modified polyoxytetramethylene glycol copolymerized with a specific constituent may also be used), the ratio of said polycapramide to said polyoxymethylene glycol being in a specified range, and the distribution of the polycapramide content throughout said block copolymer being uniform in a specified range (the uniformity of polycapramide content distribution can be specified in terms of polyamide partition ratio as described later). The present invention has been accomplished on the basis of the above finding.

BEST MODE FOR CARRYING OUT THE INVENTION

Figure 1:
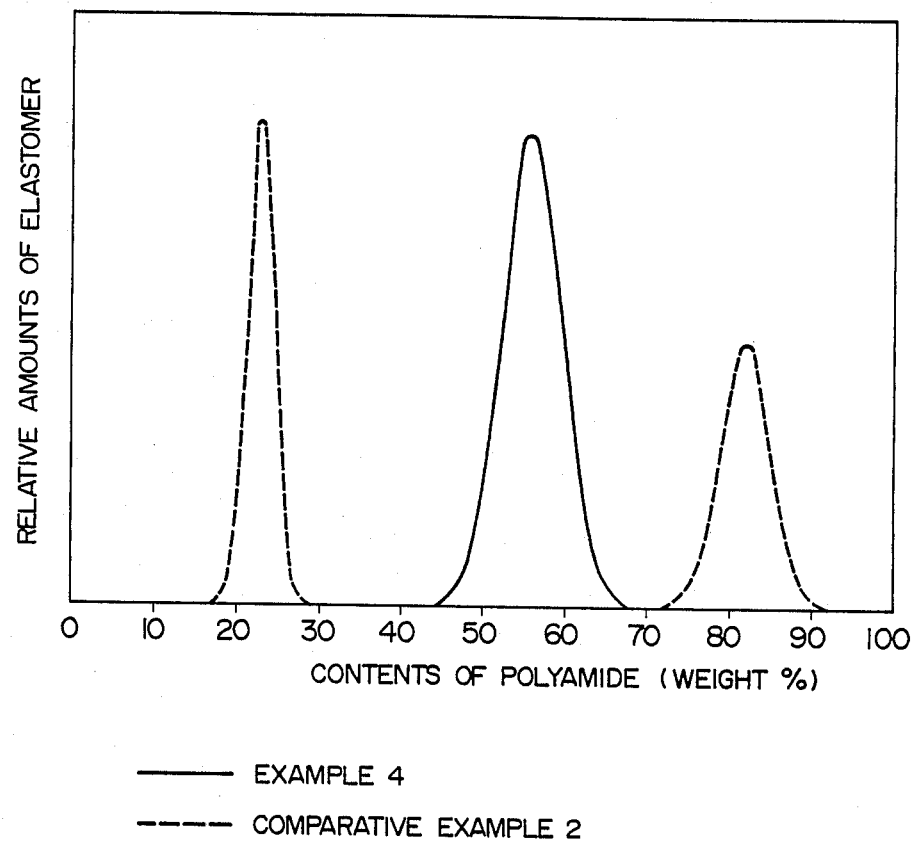
FIG. 1 represents distribution of the polyamide content in the elastomer obtained in Example 4, one of the Examples of this invention, and that in the elastomer obtained in Comparative Example 2.

The present invention provides a polyamide elastomer having a relative viscosity of 1.5 or above in m-cresol (0.5 weight/volume %) at 30° C., a polyamide partition ratio of from 0.7 to 1.3, a Shore hardness of 60A to 50D, a tensile strength of 150 kg/cm² or above, and a cloudiness (haze value) of 75% or below at a thickness of 1 mm; said polyamide elastomer having a structure of dehydration condensate produced from (A) a polycapramide having a number average molecular weight of 500 to 5,000 and carboxyl end groups, which is derived from caprolactam and a dicarboxylic acid having 4 to 20 carbon atoms selected from aliphatic dicarboxylic acids, alicyclic dicarboxylic acids and aromatic dicarboxylic acids and (B) a polyoxytetramethylene glycol having a number average molecular weight of 800 to 5,000 or a modified polyoxymethylene glycol having a number average molecular weight of 800 to 5,000 and having, in the molecular chain, the units represented by the general formula $$+O-R+ \qquad (I)$$

(wherein R is a branched chain alkylene group having 4 to 20 carbon atoms or a straight chain alkylene group having 5 to 20 carbon atoms), the units content being 50% by weight or less, the weight ratio of the component (A) to the component (B) in the elastomer being from 10:90 to 60:40.

The hard segment of the present polyamide elastomer is composed of a polycapramide having carboxyl end groups, which is derived from a dicarboxylic acid having 4 to 20 carbon atoms selected from aliphatic dicarboxylic acids, alicyclic dicarboxylic acids, and aromatic dicarboxylic acids and caprolactam. As examples of said dicarboxylic acids, mention may be made of aliphatic dicarboxylic acids such as adipic acid, sebacic acid, azelaic acid, and dodecanedioic acids; alicyclic acids such as cyclohexanedicarboxylic acid and decalindicarboxylic acid; and aromatic dicarboxylic acids such as isophthalic acid, terephthalic acid and naphthalenedicarboxylic acid.

The molecular weight of the polycapramide with carboxylic end groups derived from the above dicarboxylic acids and caprolactam should be in the range of from 500 to 5,000 on a number average basis. The said average molecular weight is a value calculated from the composition of charge and the amount of caprolactam recovered in the polymerization step. An average molecular weight below 500 is undesirable because of a decrease in mechanical strength owing to the decrease in cohesive force of the hard domain, while a molecular weight exceeding 5,000 is undesirable because the transparency is injured. The melting point of the polyamide elastomer bears a close relation to the molecular weight of polyamide of the hard segment. In view of the heat resistance and the meltmoldability, a preferable number average molecular weight of the polycapramide having a carboxyl end group is 800 to 3,000.

The soft segment is composed of a polyoxytetramethylene glycol or a modified polyoxytetramethylene glycol. As R in the general formula $$+O-R+ \qquad (I)$$

contained in the modified polyoxytetramethylene glycol, there may be mentioned 1-methyl-1,3-propylene, 2-methyl1,3-propylene, 2,2-dimethyl-1,3-propylene, 1,5-pentamethylene, 1,6-hexamethylene, and 1,8-octamethylene. The modified polyoxytetramethylene glycol is obtained by replacing a part of the tetramethylene glycol units with diol units represented by the general formula $$HO-R-OH \qquad (II)$$

wherein R is a branched-chain alkylene glycol having 4 to 20 carbon atoms or a straight-chain alkylene group having 5 to 20 carbon atoms.

As examples of diols represented by the general formula (II), there may be mentioned branched chain diols such as 1,3-butanediol, 2-methyl-1,3-propanediol, neopentyl glycol, and 2,4-hexanediol and straight-chain diols such as 1,5-pentanediol, 1,6-hexanediol, and 1,8-octanediol. Especially preferred are branched chain diols such as neopentyl glycol.

The amount of modifying diol in the modified polyoxytetramethylene glycol is preferably at least 3% by weight based on the total amount of modified polyoxytetramethylene glycol. If the said amount is below 3% by weight, the improving effect on the physical properties at low temperature becomes insufficient. In order to keep the merit of polyoxytetramethylene glycol from impairment, the amount of modification is preferably 50% by weight or below. The modified polyoxytetramethylene glycol can be obtained by adding an anhydrous heteropolyacid and a prescribed modifying diol in an amount of 2 to 15 times the heteropolyacid to tetrahydrofuran and allowing the mixture of tetrahydrofuran and the diol to polymerize.

The polyoxytetramethylene glycol or modified polyoxytetramethylene glycol for the soft segment has a number average molecular weight of 800 to 5,000. The molecular weight below 800 is undesirable because of a decrease in the molecular weight of corresponding polyamide, though depending upon the composition, thereby resulting in insufficient mechanical strength and lower melting point. The molecular weight exceeding 5,000 is also undesirable, because difficulty is encountered in polymerization and the rubber-like elasticity at low temperatures is reduced.

In the polyamide elastomer of this invention, the ratio of the polycapramide component to the polyoxytetramethylene glycol or modified polyoxytetramethylene glycol component is selected from the range of from 10:90 to 60:40 by weight. It is undesirable to use the polycapramide component in an amount exceeding the above range, because the elastomer is reduced in flexibility. It is also undesirable to use the polycapramide component in an amount below the above range, because the elastomer becomes inferior in strength.

The elastomer of this invention has a structure of a dehydration condensate between the above capramide component and the polyoxytetramethylene glycol or modified polyoxytetramethylene glycol component, the ratio of both components being in the above range. The polyamide partition ratio should be from 0.7 to 1.3.

The polyamide partition ratio, as herein referred to, is a value expressed by the formula $$\text{Polyamide partition ratio} = \frac{\text{Polyamide content of soluble portion}}{\text{Polyamide content of insoluble portion}}$$

which is determined by dissolving above 40 to 60% of the elastomer in at least one solvent selected from methanol, ethanol, hexafluoroisopropanol, chloroform, and formic acid to separate the elastomer into a soluble portion and an insoluble portion, and then determining the polyamide content (weight-%) of the soluble and insoluble portions by $^1$H-NMR, as measured in a phenol-deutero chloroform solvent, by means of the ratio between the methylene radical adjacent to oxygen in the polyoxytetramethylene glycol at 3.3–3.4 ppm and the methylene radical adjacent to the carboxyl group in the polycapramide at 2.0–2.1 ppm. The polyamide partition ratio can also be determined from the infrared absorption spectrum in the following way. The separated elastomer is dissolved in hexafluoroisopropanol to a concentration of 3 to 10% by weight and the solution is cast on a KBr plate to form a piece of film. From the infrared absorption spectrum of the film, the intensity ratio between the second absorption of amide at 1540–1550 cm$^{-1}$ and the absorption of ether linkage at 1110–1115 cm$^{-1}$ is determined. The polyamide content is determined by referring to the previously plotted calibration curve. The polyamide content found from the infrared absorption spectrum quite well coincides with that found from NMR and, hence, can be a simple and convenient method when the calibration curve can be plotted.

The polyamide partition ratio below 0.7 or above 1.3 is undesirable, because a decrease in tensile strength or a loss in transparency is observable.

The polyamide partition ratio is a criterion for the uniformity of composition. Although both the polycapramide and the polyoxytetramethylene glycol have a distribution of molecular weight, the polyamide partition ratio of a uniformly polymerized elastomer must be unity, whatever the proportion of soluble portion might be. However, even when the actual polymerization is uniformly carried out, some fluctuation in the composition seems possible. A polyamide elastomer having a polyamide partition ratio in the range of from 0.7 to 1.3 exhibits such physical properties as flexibility, toughness and transparency.

The solvent system for the determination of polyamide partition ratio is suitably selected depending upon the content and molecular weight of polycapramide, since the solubility varies with the content of polycapramide which is the hard segment of the elastomer and the elastomers with lower molecular weight polycapramide are easily soluble, while those with higher molecular weight polycapramide are difficult to be soluble. It is generally desirable to use an ethanol-chloroform mixed solvent for an elastomer with a polycapramide having a number average molecular weight of 500–700, a methanolchloroform mixed solvent for an elastomer with a polycapramide having a number average molecular weight of 700–1400, a methanol-hexafluoroisopropanol mixed solvent for an elastomer with a polycapramide having a number average molecular weight of 1400–5000, or a formic acid-methanol mixed solvent for an elastomer with a polycapramide having a number average molecular weight of 900–3000. For an elastomer with polycapramide having a molecular weight in the region where the solvent system is to be changed, either of the solvent systems may be used. The proportion of each component in a mixed solvent can be optionally selected.

The polyamide elastomer of this invention is copolymerized so as to have a Shore hardness (ASTM D 2240) of 60A–50D, a tensile strength (JIS K 6301) of 150 kg/cm$^2$ or above, and a cloudiness (haze value; ASTM D 1003-61; tested on a piece of sheet of about 1 mm in thickness) of 75% or below. The hardness of the elastomer can be controlled chiefly by the polycapramide content. In particular, a flexible and tough elastomer having a Shore hardness of 60A–40D, a hardness belonging to a crosslinked rubber region, can be produced by adjusting the polycapramide content of the elastomers to 15–45% by weight and the number average molecular weight of the polycapramide with carboxyl end groups to 800–3000. Owing to a high cohesive force of the polycapramide, an increase in its content tends to increase the strength of the elastomer. However, in order to bring the tensile strength to 150 kg/cm$^2$ or above, usually to 200–400 kg/cm$^2$, it is necessary to conduct the polymerization so as to bring the relative viscosity of the said elastomer to 1.5 or above, as measured at 0.5% by weight in m-cresol and 30° C.

The polyamide elastomers of the present invention has a transparency of 75% or below in terms of cloudiness (haze value) of a sheet of 1 mm in thickness, unless pigments, fillers, or other polymers are added.

The low temperature characteristics are important characteristics among others required for the elastomer. The low temperature characteristics are influenced to a large extent by the properties of soft segment. Owing to its straight chain structure, polyoxytetramethylene glycol tends to crystallize when the molecular weight becomes larger to a certain extent and such a tendency becomes larger especially at low temperatures. As a consequence, when the polymer is not uniform in composition, there is a portion where the polyoxytetramethylene glycol content is large to render portion easily freezable at low temperatures to reduce the low temperature characteristics.

The polyamide elastomer of the present invention has uniform composition, the polyamide partition ratio being 0.7–1.3, and improved low temperature characteristics. Commercial products of polyoxytetramethylene glycol, however, have a molecular weight distribution as broad as 1.7–2.4 in terms of $\overline{M}_{vis}/\overline{M}_n$ as described in U.S. Pat. No. 3,925,484, $\overline{M_n}$ as a number average molecular weight determined from the terminal hydroxyl value and $M_{vis}$ is a viscosity average molecular weight defined by the formula $$\overline{M_{vis}} = \text{antilog } (0.493 \log \eta + 3.0646)$$

where $\eta$ is the melt viscosity, in poise, at 40° C.]. Such a commercial product, if used in the present elastomer, might not always meet the required low temperature characteristics, though depending upon the molecular weight of said product. It has been found that the low temperature characteristics are further improved by the use of a polyoxytetramethylene glycol having a molecular weight distribution as narrow as 1.6 in terms of $\overline{M_{vis}}/\overline{M_n}$. Furthermore, to obtain a polyamide elastomer having a low hardness and better low temperature characteristics, it is preferable to use a polyoxytetramethylene glycol having number average molecular weight of 1,500–4,000.

The polyoxytetramethylene glycol having such a narrow molecular weight distribution is obtained by subjecting a commercial product to such a treatment as reprecipitation or extraction. A new polymerization method for the polymerization of tetrahydrofuran by using a heteropolyacid as a catalyst has recently been developed. A polyoxytetramethylene glycol obtained by such a method has $\overline{M_{vis}}/\overline{M_n}$ value of 1.2–1.6 and is used favorably in the present invention.

It has also been found that the elastomer is improved in low-temperature characteristics by using, as the soft segment a modified polyoxytetramethylene glycol which is a polyoxytetramethylene glycol having its oxytetramethylene units replaced by another oxyalkylene group. This is because the copolymerized oxyalkylene group keeps the polyoxytetramethylene glycol component from freezing at low temperatures. Such an effect becomes enhanced when said oxyalkylene group has a side chain.

For the preparation of polyamide elastomers, there have been proposed various methods such as, for example, a method of dehydration condensation between a polyamide having carboxyl groups at both ends and a polyoxytetramethylene glycol by use of a catalyst (U.S. Pat. Nos. 4,230,838, 4,331,786), and a method of polymerization of a mixture comprising an aminocarboxylic acid or lactam having 10 or more carbon atoms, a polyoxytetramethylene glycol, and a dicarboxylic acid after addition of water to the mixture (U.S. Pat. No. 4,207,410). In the latter method, the polymerization of lactam proceeds preferentially, while substantially no esterification takes place, resulting in a polymerization mixture comprising a polyamide having carboxyl end groups and the polyoxytetramethylene glycol [Die Angewandte Makromolekulare Chemie, Vol. 74, p. 49 (1978)], and then both components are allowed to undergo dehydration condensation. There has been proposed another method in which a mixture of ε-aminocaproic acid, polyoxytetramethylene glycol and a dicarboxylic acid is melted by heating and allowed to polymerize [Japanese Patent Application 'Kokai' (Laid-open) No. 21,095/83; U.S. Pat. No. 4,376,856]. In this method, because ε-aminocaproic acid polymerizes rapidly with generation of a large amount of water, a polyamide is preferentially formed during the melting by heating or in the initial stage of polymerization, then followed by the condensation between the polycapramide with carboxyl end groups and the polyoxytetramethylene glycol, resulting in a polyether-ester-amide. amide.

In all of the above methods, a polycapramide having carboxyl end groups, which was formed prior to or is formed preferentially during the condensation reaction, is allowed to condense with a polyoxytetramethylene glycol. Owing to the extremely low miscibility of both components with each other, coarse phase separation takes place during the polymerization to form a milky white melt which remains as such until the end of polymerization and a highly uniform polymer is not obtained. Such a tendency becomes more marked with increased number average molecular weights of polyoxytetramethylene glycol. When use is made of a polyoxytetramethylene glycol having a number average molecular weight of 800 or above required for the elastomer of this invention, the melt is milky white in appearance and the resulting elastomer shows a polyamide partition ratio of 0.5 or below, an opacity corresponding to a cloudiness (haze value) of 90% or above, and a low strength. U.S. Pat. No. 4,230,838, U.S. Pat. No. 4,331,786, and U.S. Pat. No. 4,376,856 disclosed in the examples that when a polycapramide is used as the hard segment, polyoxytetramethylene glycols having a number average molecular weight of 600–800 are chiefly used. When polyoxytetramethylene glycols having a number average molecular weight of 600–800 are used and polymerized with a polycapramide having carboxyl end groups, the melt shows translucency at first, then becomes milky white with the progress of polymerization and the resulting elastomer is opaque but shows a relatively high strength due probably to some improvement in miscibility.

However, all of the methods described in U.S. Pat. No. 4,230,838, U.S. Pat. No. 4,331,786, U.S. Pat. No. 4,207,410, and U.S. Pat. No. 4,376,856 give an opaque elastomer when a 6-nylon type polyamide elastomer is prepared. These methods, therefore, cannot be adopted in preparing a polyamide elastomer of this invention.

In preparing a polyamide elastomer of this invention, use is made of a method which will not give rise to coarse phase separation during the polymerization but gives transparent melt throughout the period of polymerization. As such a method, mention may be made of a method in which (A) caprolactam, (B) a polyoxytetramethylene glycol having a number average molecular weight of 800–5,000 or a modified polyoxytetramethylene glycol having a number average molecular weight of 800–5,000 and having, in the molecular chain, a unit represented by the general formula $-\!\!-\!\!\text{O}\!-\!\!\text{R}\!-\!\!-$ (wherein R is a branched chain alkylene group having 4 to 20 carbon atoms or a straight chain alkylene group having 5 to 20 carbon atoms), the content of said unit being 50% by weight or less, and (C) a dicarboxylic acid selected from aliphatic dicarboxylic acids, alicyclic dicarboxylic acids, and aromatic dicarboxylic acids [the proportion of (B) and (C) being such that the amount of hydroxyl group in (B) is substantially equivalent to the amount of carboxyl group in (C)] are polymerized at 150°–300° C., preferably 180°–280° C., while the water content of the polymerizate being kept at 0.1–1% by weight. This method, in contrast with the aforementioned methods, permits the amidation and esterification to take place simultaneously and the polymerization to proceed while the transparent melt state being retained. After completion of the polymerization, unreacted caprolactam is removed and, if necessary, the polymerizate is further subjected to post polymerization at 200°–300°

C., preferably 230°–280° C., thereby to obtain a transparent elastomer having a polyamide partition ratio of 1.3–0.7. In this method the ratio of conversion of caprolactam to esterification is approximately in the following range:

$$\frac{\text{Conversion of caprolactam}}{\text{Conversion of carboxyl group (esterification)}} = 0.2 - 3$$

depending upon the molecular weight of polyoxytetramethylene glycol and the amount of caprolactam. A water content of the polymerizate exceeding 1% by weight is undesirable, because the polymerization of caprolactam proceeds preferentially to cause the phase separation. A water content below 0.1% by weight is also undesirable, because of such disadvantages that esterification proceeds preferentially and the polymerization of caprolactum is difficult to take place and an elastomer of intended composition is difficult to obtain. The water content of the polymerizate is selected from the range of 0.1–1% by weight depending upon the intended polymer. In some cases it is possible to adapt such a procedure that with the progress of polymerization the water content of the polymerizate is decreased. The water content of the polymerizate can be controlled by means of a stream of inert gas (for example, nitrogen and argon) or by applied vacuum, a pressure of 150–600 mmHg being preferred. After removal of caprolactam, the polymerizate can be subjected to post polymerization while removing the water formed preferably under a vacuum of 5 mmHg or less to obtain a higher polymer.

There is another advantageous method in which three components are allowed to react while removing the water formed to continue the polymerization at 150°–300° C., preferably 180°–280° C., said three components being a polycapramide having carboxyl groups at both ends and a number average molecular weight of 300–4,000, which is obtained by the reaction of a dicarboxylic acid selected from aliphatic dicarboxylic acids, alicyclic dicarboxylic acids, or aromatic dicarboxylic acids with caprolactam; a caprolactam in an amount of 0.7, usually 0.9–3, times said capramide; and a polyoxytetramethylene glycol having a number average molecular weight of 800–5,000 or a modified polyoxytetramethylene glycol having a number average molecular weight of 800–5,000 and having, in the molecular chain, a unit represented by the general formula $$\pm O-R\pm \quad (I)$$

(wherein R is a branched chain alkylene group having 4–20 carbon atoms or a straight chain alkylene group having 5–20 carbon atoms), the content of said units being 50% by weight or less. In this method, amidation and esterification also takes place simultaneously and the coarse phase separation disappears with the progress of polymerization, resulting in a transparent homogeneous melt. After completion of the polymerization, unreacted caprolactam is removed as in the above method, and, if necessary, further subjected to post polymerization at 200°–300° C., preferably 230°–280° C. to obtain a transparent elastomer having a polyamide partition ratio of 1.3–0.7.

In the above methods, an esterification catalyst can be used as a polymerization accelerator. As examples of preferred catalysts, mention may be made of phosphoric acid, polyphosphoric acid; tetraalkyl orthotitanates such as tetrabutyl orthotitanate and tetraisopropyl orthotitanate; tin type catalysts such as dibutyltin oxide and dibutyltin laurate; manganese type catalysts such as manganese acetate; and lead type catalysts such as lead acetate. The addition of the catalyst can be performed at earlier stage of polymerization, at intermediate stage of polymerization, or at later stage of polymerization. As specially preferred catalysts, there may be mentioned phosphoric acid, polyphosphoric acids, tetrabutyl orthotitanate, and tetraisopropyl orthotitanate. It is also desirable to use the esterification catalysts in post polymerization.

To improve the thermal stability of the polyamide elastomer thus obtained, there may be used stabilizers such as various antithermal ageing agents and antioxidants, which may be added at any of the earlier stage, intermediate stage, and later stage of polymerization or after polymerization and before molding. As examples of thermal stabilizers, there may be mentioned various hindered phenols such as N,N'-hexamethylenebis(3,5-di-tert-butyl-4-hydroxycinnamide), 4,4'-bis(2,6-di-tert-butylphenol), and 2,2'-methylenebis(4-ethyl-6-tert-butylphenol); aromatic amines such as N,N'-bis-($\beta$-naphthyl)-p-phenylenediamine, N,N'-diphenyl-p-phenylenediamine, and poly(2,2,4-trimethyl-1,2-dihydroquinoline); copper salts such as copper chloride and copper iodide; sulfur compounds such as dilauryl thiodipropionate; and phosphorus compounds. These additives are used in the amount commonly used, that is, generally 0.1–5% by weight.

The invention is illustrated below in more detail with reference to Examples but the invention is not limited thereto.

In Examples various physical properties were tested in the following manner.

(1) Relative viscosity.

Test is performed under the conditions: 0.5 weight-/volume % in m-cresol at 30° C.

(2) Shore hardness

Test is performed in accordance with ASTM D 2240 by using a durometer.

(3) Tensile strength

The elastomer is molded into a sheet of 1 mm in thickness by means of a hot press and dumbbell test pieces are died out of the sheet. The test pieces are tested for the strength in compliance with JIS K 6301 by means of a tensile testing machine (Instron Co.).

(4) Cloudiness (haze value)

A piece of sheet of 1 mm in thickness is tested by means of a hazemeter in accordance with ASTM D 1003-61.

(5) Polyamide partition ratio

The elastomer sheet of 1 mm in thickness is cut into fine pieces. About 1 g of this sample is added to 100 ml of a solvent, stirred at 25° C. for 3 hours, and separated into a soluble portion and an insoluble portion by centrifigation or filtration. Each portion is tested for $^1$H-NMR in a phenol-deutero chloroform mixture containing 10% by weight of phenol. The polyamide content (% by weight) of each portion is determined from the ratio between the methylene radical adjacent to oxygen in the polyoxytetramethylene glycol at 3.3–3.4 ppm and the methylene radical adjacent to the carbonyl group in the polycapramide at 2.0–2.1 ppm. The polyamide partition ratio is then obtained from the formula $$\text{Polyamide partition ratio} = \frac{\text{Polyamide content of soluble portion}}{\text{Polyamide content of insoluble portion}}$$

In case a hexafluoroisopropanol-methanol system is used as a solvent, the amount to be used of the solution is 50 ml.

When modified polyoxyalkylene glycol is used, the polyamide partition ratio is determined by taking into account a methyl group in the side chain of copolymerized oxyalkylene group and a methylene or methine group adjacent to oxygen beside the above-noted NMR absorption peaks. In the case of some of the samples, the sample is dissolved in hexafluoroisopropanol to a concentration of 3-10% by weight, then cast on a KBr plate to form a film, and tested for infrared absorption spectrum. Using the calibration curve plotted from the data of known samples, the polyamide content was estimated from the absorption intensity ratio between the second absorption of amide at about 1545 cm$^{-1}$ and the absorption at about 1113 cm$^{-1}$ due to the stretching vibration of C-O-C. In order to improve the precision of quantitative determination, it is necessary to cast the film so that all of the infrared absorption peaks may exhibit an absorbance of 0.5 or below.

(6) Number average molecular weight ($\overline{M_n}$) of polyoxytetramethylene glycol.

The number average molecular weight was determined from the hydroxyl value obtained by the method of phthalic anhydride-pyridine.

(7) Viscosity average molecular weight ($\overline{M_{vis}}$) of polyoxytetramethylene glycol.

Viscosity was measured by means of a cone plate viscometer at 40° C. and $M_{vis}$ was calculated from the formula $$\overline{M_{vis}} = \text{antilog}\ (0.493\ \log\eta + 3.0646)$$

(where $\eta$ is a viscosity measured at 40° C. and expressed in poise).

(8) Elastic recovery (at 100% extension).

Dumbbell test pieces each having a test portion, 48 mm in length and 3 mm in width, are died out of a sheet of 1 mm in thickness. Mark lines are placed on the test piece at a distance of 48 mm between them. The test piece is extended by 100% at 23° C. and held at a prescribed temperature for 15 minutes. The test piece is ten released of the stress and held at the same temperature for 10 minutes. The distance (a) between the mark lines is measured and the elastic recovery is calculated from the formula $$\text{Elastic recovery (\%)} = \frac{48 - (a - 48)}{48} \times 100$$

EXAMPLE 1

Into a 4 liter three necked flask provided with a stirrer, a nitrogen inlet tube, and a reflux condenser, are charged 1 kg of tungustophophoric acid made anhydrous by heating at 250° C. for 3 hours, 2 liters of tetrahydrofuran, and 19 g of water. The mixture is allowed to react at 50°-55° C. for 10 hours. The supernatant is collected by decantation, then concentrated, and diluted with 2 liters of hexane to precipitate and remove a small amount of dissolved catalyst. After removal of tetrahydrofuran and hexane by distillation, there is obtained 450 g of transparent and viscous polymer. This polymer is polyoxytetramethylene glycol having $\overline{M_n}$ of 2070, $\overline{M_{vis}}$ of 3110, and $\overline{M_{vis}}/\overline{M_n}$ of 1.50.

Into a 500 ml separable flask provided with a stirrer, a nitrogen inlet tube, and a distillate outlet tube, are charged 85 g of caprolactam, 10.9 g of adipic acid, 154.2 g of polyoxytetramethylene glycol obtained above, 0.3 g of phosphoric acid, and 0.3 g of N,N'-hexmethylenebis(3,5-di-tert-butyl-4-hydroxycinnamide) (Irganox 1098, trade name) as an antioxidant. While introducing nitrogenstream at a rate of 50 ml/minute, the mixture is allowed to polymerize at 260° C. for 5 hours. The water contents of the polymerizates after 1, 2, 4 and 5 hours from the beginning of polymerization are 0.7, 0.5, 0.4 and 0.4% by weight, respectively. After addition of 0.3 g of tetraisopropyl titanate, the mixture is removed of unreacted caprolactam under reduced pressure at the same temperature, and the residue is polymerized for 3 hours under 1 Torr to yield a transparent elastomer. This elastomer contained 68% by weight of polyoxytetramethylene glycol and the polyamide showed a number average molecular weight of 970, a relative viscosity of 1.96, a melting point of 195°-205° C., a tensile strength of 420 kg/cm$^2$, a tensile elongation at break of 900%, a hardness (Shore A) of 85, and a cloudiness (haze value) of 30%.

One gram of the elastomer is added to 100 ml of methanol containing 20% by volume of chloroform, stirred for 3 hours, and centrifuged to separate into soluble and insoluble portions. The polyamide partition ratio is determined. It is found that the soluble portion is was 45% by weight, polyamide contents of soluble portion and insoluble portion were 31% by weight and 34% by weight, respectively, and the polyamide partition ratio is 0.91.

EXAMPLE 2

Into the same apparatus as used in Example 1, are charged 28.5 g of polycapramide having carboxyl end groups and a number average molecular weight of 570, which is obtained from caprolactam and adipic acid, 107.5 g of a polyoxytetramethylene glycol ($\overline{M_n}$=2150, $\overline{M_{vis}}$=3160, $\overline{M_{vis}}/\overline{M_n}$=1.47), 46 g of caprolactam, 0.15 g of phosphoric acid, and 0.15 g of Irganox 1098. While passing nitrogen at a rate of 30 ml/minute, the mixture is polymerized at 220° C. for 2 hours, at 240° C. for 2 hours. After addition of 0.2 g of titanium tetrabutoxide and 0.3 g of poly(2,2,4-trimethyl-1,2-dihydroquinoline) ("Nocrac" 224, trade name for an antioxidant), the polymerization mixture is removed of unreacted caprolactam by heating at 260° C. under reduced pressure and further polymerized for 1.5 hours under a pressure of 1 Torr to yield a transparent elastomer. The water contents of the polymerizates after 2, 4 and 6 hours from the beginning of polymerization are 0.6, 0.4 and 0.4% by weight, respectively. This elastomer contained 71% by weight of polyoxytetramethylene glycol and the polyamide showed an average molecular weight of 840, relative viscosity of 1.80, melting point of 175°-191° C., tensile strength of 370 kg/cm$^2$, tensile elongation at break of 900%, hardness of 81 (Shore A), and cloudiness (haze value) of 35%. One gram of the elastomer is placed in 100 ml of methanol, stirred for 3 hours, and centrifuged to separate into a soluble portion and an insoluble portion. The polyamide partition ratio is determined. It is found that the soluble portion is 42% by weight, polyamide contents of soluble portion and insoluble portion are 34% by weight and 29% by weight, respectively, and the polyamide partition ratio is 1.16. Further, the elastic recovery of the elastomer is tested. The results obtained are as shown in Table 1.

COMPARATIVE EXAMPLE 1

Into the apparatus of Example 1, in which the distillate outlet tube had been replaced by a reflux condenser, were charged 167 g of caprolactam, 33.2 g of adipic acid, and 6 g of water. The mixture is allowed to react at 260° C. for 6 hours to synthesize a polycapramide having a carboxyl end group. This substance had an average molecular weight of 883, as estimated from the measurement of acid value.

Into the apparatus of Example 1, are charged 40 g of the polyamide obtained above, 97.4 g of the same polyoxytetramethylene glycol as used in Example 2, 0.3 g of Irganox 1098, and 0.2 g of tetrabutyl orthotitanate. After melting at 240° C. and pressure reduction the mixture is allowed to polymerize for 2 hours under a pressure of 1-3 Torr, then for further 8 hours at 260° C. under a pressure of 1-3 Torr. During the polymerization, coarse phase-separation took place and the melt became milky white in appearance and remained as such until the end of polymerization, resulting in an opaque elastomer. This elastomer contained 70% by weight of polyoxytetramethylene glycol and showed a relative viscosity of 1.45, melting point of 95°-120° C., Shore hardness of 50A, cloudiness (haze value) of 92%, tensile strength of 40 kg/cm$^2$, and tensile elongation at break of 900%. The elastomer is fragile.

Upon treatment of the elastomer with methanol in the same manner as in Example 2, it is found that the soluble portion was 46% by weight, polyamide contents of soluble portion and insoluble portion are 15% by weight and 43% by weight, respectively, and the polyamide partiton ratio was 0.35. Further, the elastic recovery is tested. The results obtained are as shown in Table 1.

TABLE 1

| | PTMG | | Elastic recovery (%) | | |
|---|---|---|---|---|---|
| | $M_n$ | $M_{vis}/M_n$ | −10° C. | 0° C. | 23° C. |
| Example 2 | 2150 | 1.47 | 80 | 93 | 95 |
| Comparative Example 1 | 2150 | 1.47 | 2 | 8 | 94 |

Note: PTMG: Polyoxytetramethylene glycol

EXAMPLE 3

Into the apparatus of Example 1, are charged 151 g of caprolactam, 111 g of polyoxytetramethylene glycol (PTG - 200 of Hodogaya Chemical Co.; $\overline{M}_n$=1110, $\overline{M}_{vis}/\overline{M}_n$ 2.23), 15.6 g of adipic acid together with 0.15 g of Irganox 1098 and 0.15 g of phosphoric acid. While passing 20 ml/minute of nitrogen, the mixture is polymerized for 2 hours at 220° C., 2 hours at 240° C., and 8 hours at 260° C. The pressure is gradually reduced at the same temperature and unreacted caprolactam is distilled off into the outside of the system under a pressure of 1 Torr in 30 minutes to obtain a pale yellow transparent elastomer. The conversion of caprolactam and the decrease in acid value, which corresponds to esterification, were respectively 37% and 38% after 2 hours, 57% and 65% after 4 hours, and 76% and 92% after 12 hours. The water content of polymerizate, as determined with the passage of time, is 0.6, 0.8, 0.5, 0.4 and 0.3% by weight, respectively, after 1, 2, 4, 8 and 12 hours from the beginning of polymerization. This elastomer contained 44% by weight of polyoxytetramethylene glycol. The polyamide showed a number average molecular weight of 1410, relative viscosity of 1.68, melting point of 197°-208° C., tensile strength of 360 kg/cm$^2$, tensile elongation at break of 750%, Shore hardness of 45D, and cloudiness (haze value) of 53%. Upon treating the elastomer with a chloroform-methanol mixed solvent containing 75% of chloroform, it is found that the soluble portion is 45% by weight and the polyamide partition ratio is 0.92.

EXAMPLE 4

Under the same conditions as in Example 2, a transparent polyamide elastomer is obtained by using 31 g of polycapramide having a number average molecular weight of 600, which is obtained from adipic acid and caprolactam, 57.5 g of polyoxytetramethylene glycol (PTG-200), and 60 g of caprolactam. This elastomer contained 45% by weight of polyoxytetramethylene glycol and showed an average molecular weight of 1320, a relative viscosity of 1.78, melting point of 193°-200° C., tensile strength of 400 kg/cm$^2$, tensile elongation at break of 730%, hardness (Shore D) of 42, and cloudiness (haze value) of 55%.

Upon treatment of the elastomer with a chloroform-methanol mixed solvent containing 75% by volume of chloroform, it is found that the soluble portion is 50% by weight and the polyamide partition ratio is 0.95. The melting point of the soluble portion is 184°-197° C. and that of insoluble portion is 190°-196° C.

Further, 10 g of the elastomer is subjected to fractional dissolution by using a hexane-ethanol mixed solvent and a methanol-formic acid mixed solvent with the mixing ratio being successively changed. The polyamide content of each fraction is determined from NMR and IR spectrum. The results obtained were as shown in Table 2. Then, the cumulative weight of fractions having a lower polyamide content than that of each fraction is calculated and expressed as the ratio of the cumulative weight to the total weight of all fractions. The interrelationship between the polyamide content and the cumulative weight is plotted, with the former as abscissa and the latter as ordinate. This relationship is converted into a functional formula from which the distribution of polyamide content is obtained by differentiation. The results obtained are as shown in FIG. 1.

TABLE 2

| Fraction No. | Fractionation solvent | Weight of fraction (% by weight) | Hard segment content (% by weight) |
|---|---|---|---|
| 1 | Methanol | 8.0 | 46.7 |
| 2 | 5 vol. % formic acid-methanol | 4.8 | 52.7 |
| 3 | 10 vol. % formic acid-methanol | 10.4 | 53.7 |
| 4 | 15 vol. % formic acid-methanol | 17.6 | 54.7 |
| 5 | 20 vol. % formic acid-methanol | 24.8 | 55.1 |
| 6 | 30 vol. % formic acid-methanol | 13.6 | 57.4 |
| 7 | 35 vol. % formic acid-methanol | 8.0 | 58.2 |
| 8 | 40 vol. % formic acid-methanol | 9.6 | 60.2 |
| 9 | 50 vol. % formic acid-methanol | 3.2 | 62.0 |

COMPARATIVE EXAMPLE 2

75.6 g of a polyamide having carboxyl end groups and a number average molecular weight of 1260 which had been obtained from adipic acid and caprolactam, and 66.6 g of polyoxytetramethylene glycol are polymerized under the same conditions as those of Comparative Example 1 to produce an opaque milky white elastomer. This elastomer is fragile one having a Shore hardness of 27D, melting point of 135°–152° C., relative viscosity of 1.82, tensile strength of 100 kg/cm$^2$, and a tensile elongation at break of 100% or below. The cloudiness (haze value) is 95% and the polyamide partition ratio of 0.36 (the soluble portion is 46% by weight), as measured by use of methanol. The melting point of the soluble portion is 120°–148° C. and that of the insoluble portion is 195°–200° C. In the same manner as in Example 4, using 10 g of the elastomer the fractional dissolution is carried out and the polyamide content is determined. The results obtained are as shown in Table 3. The polyamide content distribution is determined in the same manner as in Example 4. The results obtained are as shown in FIG. 1. This elastomer is found to be a mixture of an elastomer having a hard segment content of about 80% by weight and an elastomer having a hard segment content of about 20% by weight.

TABLE 3

| Fraction No. | Fractionation solvent | Weight of fraction (% by weight) | Hard segment content (% by weight) |
|---|---|---|---|
| 1 | 5 vol. % ethanol-hexane | 4.0 | * |
| 2 | 10 vol. % ethanol-hexane | 0.8 | 20.1 |
| 3 | 15 vol. % ethanol-hexane | 8.9 | 21.5 |
| 4 | 18 vol. % ethanol-hexane | 13.0 | 22.6 |
| 5 | 20 vol. % ethanol-hexane | 6.4 | 23.8 |
| 6 | 25 vol. % ethanol-hexane | 10.5 | 24.2 |
| 7 | 30 vol. % ethanol-hexane | 2.9 | 24.2 |
| 8 | Methanol | 0.9 | 48.9 |
| 9 | 10 vol. % formic acid-methanol | 2.3 | 75.6 |
| 10 | 20 vol. % formic acid-methanol | 11.0 | 79.7 |
| 11 | 25 vol. % formic acid-methanol | 1.0 | 82.3 |
| 12 | 35 vol. % formic acid-methanol | 16.4 | 82.7 |
| 13 | 40 vol. % formic acid-methanol | 2.0 | 82.8 |
| 14 | 50 vol. % formic acid-methanol | 13.0 | 85.9 |

*Polyamide content is not determined, because almost all of the stabilizer is extracted.

* Polyamide content is not determined, because almost all of the stabilizer is extracted.

COMPARATIVE EXAMPLE 3

For the purpose of examining the miscibility between the polyamide having carboxyl end groups and the polyoxytetramethylene glycol, a polyamide having a number average molecular weight of 600 obtained from adipic acid and caprolactam and a polyamide having a number average molecular weight of 730 obtained from adipic acid and laurinlactam were separately mixed with a polyoxytetramethylene glycol ($\overline{M_n}=1110$ ($M_n=1110$, $\overline{M_{vis}}/\overline{M_n}=2.23$) in a weight ratio of 30:70 by melting together at 180° C. for 20 minutes. Upon standing at 180° C. for 15 minutes, each molten mixture separated into two layers. Upon analysis of the upper layers, the polyamide contents are found to be 3% by weight and 21% by weight, respectively. Thus, the latter polyamide is found superior in miscibility with polyoxytetramethylene glycol.

Into the apparatus of Example 1, are charged 73 g of a polyamide having a number average molecular weight of 730 obtained from adipic acid and laurinlactam, 111 g of polyoxytetramethylene glycol (PTG-200), and 0.3 g of tetrabutyl orthotitanate. The mixture was allowed to polymerize at 260° C. under a pressure of 1 Torr. The polymerizate is turbid immediately after the beginning of polymerization but became transparent and homogeneous after 30 minutes. After polymerization for 3 hours, there is obtained a transparent elastomer. This elastomer showed a melting point of 134°–148° C., relative viscosity of 1.96, hardness (Shore A) of 90, tensile strength of 180 kg/cm$^2$, tensile elongation at break of 1000%, and cloudiness (haze value) of 40%. The polyamide partition ratio (soluble portion was 50% by weight), as determined in methanol containing 40% by volume of chloroform was 0.96.

COMPARATIVE EXAMPLE 4

Into an autoclave of 500 ml in capacity, are charged the same starting materials as those of Example 3, then followed by 6.8 g of water. Upon heating at 270° C., the pressure in the autoclave showed a gauge pressure of 8 kg/cm$^2$. The reaction is continued for 7 hours at the said temperature, then the autoclave was quenched, and the contents are discharged. The contents are in two layers. The upper layer is a white solid which was found to be a polyamide having carboxyl end groups, as confirmed from the infrared absorption spectrum, and the lower layer was a liquid consisting mainly of polyoxytetramethylene glycol containing some caprolactam dissolved therein. The contents are heated at 260° C. to remove water by distillation in the apparatus used for the polymerization in Example 1 and then allowed to polymerize at said temperature for 8 hours, while introducing 50 ml/minute of nitrogen. The polymerizate is milky white in color, indicative of coarse phase separation, and remained as such independent of the progress of polymerization. After completion of the polymerization, unreacted caprolactam is distilled off by heating at 260° C. for 30 minutes under reduced pressure, leaving behind an opaque milky white elastomer. This elastomer contained 40% by weight of polyoxytetramethylene glycol and showed a melting point of 202°–207° C., relative viscosity of 1.31, tensile strength of 115 kg/cm$^2$, and tensile elongation at break of 100%, indicative of a fragile nature. The cloudiness (haze value) of the elastomer is 97% and the polyamide partition ratio is 0.39 (the soluble portion is 42% by weight), as determined in a methanol containing 15% by volume of formic acid.

COMPARATIVE EXAMPLE 5

The initial charge is the same as in Example 3, except that 172 g of ε-aminocaproic acid is used in place of the caprolactam and 0.3 g of tetrabutyl orthotitanate is used in place of the phosphoric acid. The charge is allowed to react at 220° C. for 30 minutes. The melt is homogeneous and transparent just after melting but after above 18 g of water had been distilled off in 30 minutes, the solution became milky white and it is found from the infrared absorption spectrum that there is formed a polyamide of the terminal carboxyl group and that hardly any ester linkage is formed, indicating that the polyoxytetramethylene glycol had practically not reacted. The water content of the reaction solution during this period was 2.5–3.0% by weight. The temperature of the reaction mixture is then elevated to 260° C. and the pressure is gradually reduced to 1 Torr and the polymerization is continued for 4 hours to yield an opaque milky white polymerizate. The polymerizate showed a relative viscosity of 1.35, tensile strength of 90 kg/cm$^2$, and tensile elongation at break of 100%, indicative of a fragile nature. The cloudiness is 97% and the polyamide partition ratio is 0.40, as determined in the same manner as in Comparative Example 4 (soluble portion is 45% by weight).

EXAMPLE 5

A charge comprising 83.7 g of a polyoxytetramethylene glycol (PTG-100 Hodogaya Chemical Co.; $\overline{M_{vis}}/\overline{M_n}=2.38$) having a number average molecular weight of 840, 14.6 g of adipic acid, and 48.5 g of caprolactam together with 0.2 g of phosphoric acid and 0.3 g of Nocrac 224 is polymerized at 220° C. for 2 hours, at 240° C. for 2 hours, and at 260° C. for 4 hours, while introducing 30 ml/minute of nitrogen. After 2, 4, 6 and 8 hours from the beginning of polymerization, the water contents of the polymerizates are 0.7, 0.4, 0.3 and 0.3% by weight, respectively. After addition of 0.1 g of tetrabutyl orthotitanate, unreacted caprolactam is removed under reduced pressure and the residue is polymerized for 1 hour to yield a transparent elastomer. This elastomer contained 57% by weight of a polyoxytetramethlene glycol and showed a melting point of 159 168° C., relative viscosity of 2.06, tensile strength of 420-kg/cm², tensile elongation at break of 1100%, cloudiness (haze value) of 30%, and Shore hardness of 86A. The polyamide partition ratio was 0.96, as determined in a chloroform-ethanol mixed solvent containing 10% by volume of chloroform (the soluble portion was 56% by weight).

COMPARATIVE EXAMPLE 6

Under the same conditions as in Comparative Example 1, a polyamide having a number average molecular weight of 510 derived from adipic acid and caprolactam is allowed to polymerize with a polyoxytetramethylene glycol (PTG-1000) to obtain an opaque milky white elastomer. This elastomer showed a tensile strength of 200 kg/cm², tensile elongation at break of 900%, Shore hardness of 70A, and cloudiness (haze value) of 92%. The polyamide partition ratio (the soluble portion was 60% by weight) was 0.50, as measured in ethanol.

COMPARATIVE EXAMPLE 7

Under the same conditions as in Comparative Example 1, a polyamide having a number average molecular weight of 580 derived from adipic acid and caprolactam is allowed to polymerize with a polyoxytetramethylene glycol ($\overline{M_n}=680$; $\overline{M_{vis}}/\overline{M_n}=2.65$) at 260° C. for 4 hours. The polymerizate was translucent just after the beginning of polymerization but gradually turned milky white and opaque and the viscosity also increased. The resulting elastomer showed a melting point of 132°–170° C., relative viscosity of 2.24, tensile strength of 380 kg/cm², tensile elongation at break of 870%, Shore hardness of 32D, and cloudiness (haze value) of 85%. The polyamide partition ratio is 0.67% (soluble portion is 42% by weight) as determined in 4 volume % chloroformmethanol mixed solvent.

COMPARATIVE EXAMPLE 8

Under the same conditions as in Example 3, 111 g of a polyoxytetramethylene glycol having a number average molecular weight of 1110, 14.6 g of adipic acid, 43 g of caprolactam together with 0.2 g of phosphoric acid and 0.2 g of Irganox 1098 are polymerized to yield a transparent elastomer which contained 71% by weight of polyoxytetramethylene glycol and showed a number average molecular weight (polyamide) of 450. This elastomer had a relative viscosity of 1.64, melting point of 138°–145° C., tensile strength of 120 kg/cm², and tensile elongation at break of 1300%.

EXAMPLE 6

Transparent elastomer is obtained under the same conditions as in Example 5 by polymerizing 97 g of a polyoxytetramethylene glycol having a number average molecular weight of 4040 and $\overline{M_{vis}}/\overline{M_n}$ is obtained under the same conditions as in Example 1, except that 16 g of water is used and the reaction is conducted at 30°–35° C., 3.5 g of adipic acid and 63 g of caprolactam. The resulting elastomer contained 84% by weight of polyoxytetramethylene glycol and showed a number average molecular weight (polyamide) of 770, relative viscosity of 1.99, melting point of 170°–185° C., Shore hardness of 75A, tensile strength of 365 kg/cm², tensile elongation at break of 1000%, and cloudiness (haze value) of 20%. The polyamide partition ratio is 0.79 (soluble portion is 57% by weight) as determined with methanol.

EXAMPLE 7

63.4 Grams of a polyoxytetramethylene glycol ($\overline{M_{vis}}/\overline{M_n}=1.48$) having a number average molecular weight of 3170, 62 g of a polycapramide having a number average molecular weight of 3100 obtained from adipic acid and caprolactam, and 65 g of caprolactam are polymerized under the same conditions as in Example 2 to produce a transparent elastomer which showed a melting point of 218°–225° C., relative viscosity of 1.75, polyoxytetramethylene glycol content of 48% by weight, number average molecular weight (polyamide) of 3430, tensile strength of 360 kg/cm², tensile elongation at break of 500%, Shore hardness of 41D, and cloudiness (haze value) of 48%. The polyamide partition ratio of this elastomer is 0.86 (soluble portion was 52% by weight); as determined in a hexafluoroisopropanol-methanol mixed solvent in which the concentration of hexafluoroisopropanol is 70% by weight.

EXAMPLE 8

Under the same conditions as in Example 4, except that terephthalic acid is used in place of the adipic acid, there is obtained an elastomer which showed a polyoxytetramethylene glycol content of 45% by weight, relative viscosity of 1.64, Shore hardness of 44D, tensile strength of 370 kg/cm², tensile elongation at break of 700%, and cloudiness (haze value) of 45%. The polyamide partition ratio of this elastomer is 0.89 (soluble portion is 53% by weight) as determined under the same conditions as in Example 4.

EXAMPLE 9

Polymerization is carried out under the same conditions as in Example 2, using a polycapramide having carboxyl groups at both ends obtained from decanedicarboxylic acid and caprolactam, the same polyoxytetramethylene glycol as used in Example 2, and caprolactam to yield an elastomer which showed a polyoxytetramethylene glycol content of 58% by weight, number average molecular weight of 1560 with respect to polyamide, relative viscosity of 1.82, tensile strength of 310 kg/cm², tensile elongation at break of 850%, Shore hardness of 34D, cloudiness (haze value) of 50%, and a polyamide partition ratio of 0.88 (soluble portion is 43% by weight), as determined in a tetrafluoroisopropanol-methanol mixed solvent in which the concentration of tetrafluoroisopanol is 50% by weight.

EXAMPLE 10

Into the apparatus of Example 1, are charged 66.6 g of a polyoxytetramethylene glycol (PTG-200), 81.2 g of caprolactam, 10.3 g of 1,4-cyclohexanedicarboxylic acid, 0.3 g of polyphosphoric acid, and 0.2 g of Irganox 1098. While introducing 40 ml/minute of nitrogen, the mixture is polymerized at 260° C. for 6 hours to yield a transparent elastomer. The water contents of the polymerizates after 2, 4 and 6 hours from the beginning of polymerization are 0.7, 0.5 and 0.4% by weight, respectively. The elastomer contained 50% by weight of polyoxytetramethylene glycol and showed a number average molecular weight of 1110 with respect to polyamide, relative viscosity of 1.73, tensile strength of 330 kg/cm$^2$, tensile elongation at break of 680%, cloudiness (haze value) of 43%, and polyamide partition ratio of 0.87 (soluble portion is 53% by weight) as determined in methanol containing 25% by volume of formic acid.

EXAMPLE 11

Into the apparatus of Example 1, are charged 124.2 g of the polyoxytetramethylene glycol of Example 1, 8.8 g of adipic acid, 68.4 g of caprolactam, 0.2 g of Irganox 1098, and 0.2 g of polyphosphoric acid. While introducing 100 ml/minute of nitrogen, the charge is polymerized at 260° C. for 6 hours. The water contents of the polymerizates after 1, 2, 4 and 6 hours from the beginning of polymerization were 0.8, 0.6, 0.4 and 0.3% by weight, respectively. Unreacted caprolactam is removed under reduced pressure to obtain a transparent elastomer which showed a relative viscosity of 2.2 and a polyoxytetramethylene glycol content of 72% by weight. The elastomer also showed a number average molecular weight of 810 with respect to polyamide, melting point of 178-195° C., hardness of 83A, tensile strength of 430 kg/cm$^2$, tensile elongation at break of 900%, cloudiness (haze value) of 30%, and polyamide partition ratio of 0.93 (soluble portion is 46% by weight) as determined in methanol.

EXAMPLES 12 AND 13

Polymerization is carried out in the same manner as in Example 2, except that PTG-500 (Hodogaya Chemical Co., $\overline{M_n}$=2120, $\overline{M_{vis}}/\overline{M_n}$=2.33) or Terathane-2000 (Du Pont Co., $\overline{M_n}$=2100 $\overline{M_{vis}}/\overline{M_n}$=2.00) is used as polyoxytetramethylene glycol. In both cases, transparent elastomers are obtained.

The former elastomer showed a polyoxytetramethylene glycol content of 72% by weight, relative viscosity of 1.69, melting point of 175°-194° C., tensile strength of 340 kg/cm$^2$, tensile elongation at break of 900%, Shore hardness of 83A, and cloudiness (haze value) of 40%. The latter elastomer showed a polyoxytetramethylene glycol content of 72% by weight, relative viscosity of 1.73, melting point of 176°-193° C., tensile strength of 350 kg/cm$^2$, tensile elongation at break of 900%, Shore hardness of 83A, and cloudiness (haze value) of 36%. The polyamide partition ratio is 0.78 in the former case (soluble portion is 47% by weight) and 0.85 in the latter case (soluble portion is 45% by weight), as determined under the same conditions as in Example 1. The elastic recovery is also tested. The results obtained are as shown in Table 4.

TABLE 4

| | PTMG | | Elastic recovery (%) | | |
|---|---|---|---|---|---|
| | $\overline{M_n}$ | $\overline{M_{vis}}/\overline{M_n}$ | −10° C. | 0° C. | 23° C. |
| Example 12 | 2120 | 2.33 | 15 | 25 | 85 |
| Example 13 | 2100 | 2.00 | 22 | 38 | 85 |

Note: PTMG = Polyoxytetramethylene glycol

EXAMPLE 14

Into a reactor provided with a stirrer and a reflux condenser, are charged 600 g of tetrahydrofuran and 43 g of neopentyl glycol followed by the addition of 300 g of tungstophosphoric acid ($H_3PW_{12}O_{40}$) which had been made anhydrous by heating at 250° C. for 3 hours (the number of moles of neopentyl glycol is about 4 times that of tungstophosphoric acid). The mixture is continuously stirred for 6 hours at 60° C. and then allowed to stand at room temperature to allow the reaction mixture to separate into two layers. The upper layer is concentrated and admixed with hexane to precipitate and remove a small amount of remaining tungstophosphoric acid. Upon removal of the solvent by distillation, there is obtained 135 g of a transparent viscous polymer. As the result of measurements of $^1$H-NMR (400 MHz) and $^{13}$C-NMR (400 MHz), it is found that the polymer contained a polyoxytetramethylene glycol having a number average molecular weight of 2150 and a melting point of 10.1° C. which is formed by the copolymerization of neopentyl glycol and tetrahydrofuran in a ratio of 1 : 26 and that the neopentyl glycol is incorporated in the polymer not in the former of block but in the form of dispersion throughout the polymer. A transparent elastomer is obtained by polymerizing, in the same manner as in Example 2, 80 g of the above modified polyoxytetramethylene glycol, 21.2 g of a polyamide having carboxyl end groups and a number average molecular weight of 570 prepared from caprolactam and adipic acid, 30.5 g of caprolactam, 0.15 g of phosphoric acid, and 0.1 g of Irganox. This elastomer contained 71% by weight of the modified polyoxytetramethylene glycol and showed an average molecular weight of 880 with respect to polyamide, relative viscosity of 1.62, melting point of 182°-189° C., Shore hardness of 85 A, tensile strength of 260 kg/cm$^2$, tensile elongation at break of 900%, and cloudiness (haze value) of 37%. The polyamide partition ratio (soluble portion is 49% by weight) is 0.83 as determined with methanol containing 10% by volume of chloroform. The elastic recovery is measured. The results obtained are as shown in Table 5.

COMPARATIVE EXAMPLE 9

A milky white opaque elastomer is obtained by conducting the polymerization under the same conditions as in Comparative Example 1, except that the same modified polyoxytetramethylene glycol obtained in Example 14 is used in place of the polyoxytetramethylene glycol. This elastomer contained 70% by weight of polyoxytetramethylene glycol and showed a relative viscosity of 1.41, melting point of 98°-120° C., cloudiness (haze value) of 95%, tensile strength of 70 kg/cm$^2$, and tensile elongation at break of 800%, indicating a fragile nature. When treated with methanol, the soluble portion is 48% by weight and the polyamide distribution ratio is 0.38. The results of test for the elastic recovery are as shown in Table 5.

TABLE 5

| | PTMG | Elastic recovery (%) | | | |
|---|---|---|---|---|---|
| | $\overline{M}_n$ | −20° C. | −10° C. | 0° C. | 23° C. |
| Example 14 | 2150 | 60 | 80 | 85 | 85 |
| Comparative Example 9 | 2150 | 5 | 10 | 20 | 87 |

Note: PTMG = Modified polyoxytetramethylene glycol

EXAMPLE 15

Copolymerization is carried out using 1,6-hexanediol in place of the neopentyl glycol of Example 14, the ratio of 1,6-hexanediol to tetrahydrofuran having been 1 : 23 (molar ratio). There is obtained a modified polyoxytetramethylene glycol having a number average molecular weight of 2650 and a melting point of 18.2° C.

A transparent elastomer containing 67% by weight of the above modified polyoxytetramethylene glycol is prepared in the same manner as in Example 2. This elastomer showed a relative viscosity of 1.71, melting point of 190°–202° C., number average molecular weight of 1310 with respect to polyamide, Shore hardness of 30 D, tensile strength of 320 kg/cm², and tensile elongation at break of 850%. The cloudiness (haze value) is 42% and the polyamide partition ratio was 0.85 (soluble portion was 43% by weight) as determined with methanol containing 30% by volume of formic acid. The elastic recoveries at 23° C. and −10° C. are 80% and 70%, respectively.

EXAMPLE 16

A modified polyoxytetramethylene glycol having a number average molecular weight of 1230 is prepared by copolymerizing neopentyl glycol and tetrahydrofuran in a ratio of 1 : 12 in the same manner as in Example 14, except that the neopentyl glycol is used in an amount of about 7 times the amount of tungstophosphoric acid. Into a 300-ml separable flask provided with a stirrer, a distillate outlet tube, and a nitrogen inlet tube, are charged 60 g of the above modified polyoxytetramethylene glycol, 8.1 g of terephthalic acid, 40 g of caprolactam, 0.2 g of Irganox 1098, and 0.2 g of phosphoric acid. While introducing 30 ml/minute of nitrogen, the charge is polymerized at 220° C. for 2 hours, at 240° C. for 2 hours, and at 260° C. for 5 hours. Upon removal of unreacted caprolactam under reduced pressure a transparent elastomer is obtained. During the polymerization, the water content of the polymerizate is examined at regular time intervals and found to be 0.8–0.3% by weight. The resulting elastomer contained 67% by weight of the modified polyoxytetramethylene glycol and showed a number average molecular weight of 610 with respect to polyamide, relative viscosity of 1.68, melting point of 143°–161° C., tensile strength of 250 kg/cm², tensile elongation at break of 900%, Shore hardness of 88A, and polyamide partition ratio of 1.0 (in methanol, the soluble portion being 43% by weight). The elastic recoveries at 23° C. and −20° C. were 87% and 85%, respectively.

EXAMPLE 17

In the same manner as in Example 14, using 1,5-pentanediol, a copolymerized polyoxytetramethylene glycol having a number average molecular weight of 2060 and a 1,5-pentanediol/tetrahydrofuran ratio of 1/20 (molar ratio) is obtained. In a manner similar to that in Example 2, there is obtained a transparent polymer which contained 48% by weight of the above modified polyoxytetramethylene glycol and showed a number average molecular weight of 2230 with respect to polyamide, Shore hardness of 43 D, relative viscosity of 1.60, tensile strength of 270 kg/cm², tensile elongation at break of 750%, cloudiness (haze value) of 53%, and polyamide partition ratio of 0.83 (50 volume % formic acid-methanol; soluble portion of 47% by weight). The elastic recoveries at 23° C. and −10° C. were 73% and 67%, respectively.

EXAMPLE 18

A transparent elastomer having a tensile strength of 300 kg/cm² and a tensile elongation at break of 600% is obtained by carrying out the polymerization under the same conditions as in Example 3, except that the reaction system is kept under a reduced pressure of 200–250 mmHg instead of introducing nitrogen stream. During the polymerization, the water content of the polymerizate was at a substantially constant level of 0.3–0.2% by weight. During the polymerization, the esterification and the conversion of caprolactam varied with time in the following manner. The esterification and the conversion of caprolactam were respectively 54% and 46% after one hour, 74% and 52% after 2 hours, and 88% and 62% after 6 hours. The elastomer contained 45% by weight of polyoxytetramethylene glycol and showed a relative viscosity of 1.73, melting point of 196°–202° C., Shore hardness of 46 D, cloudiness of 55%, and polyamide partition ratio of 0.96 (soluble portion was 48% by weight) as determined under the same conditions as in Example 3.

EXAMPLE 19

Into the apparatus of Example 1, are charged 151 g of caprolactam, 111 g of a polyoxytetramethyleneglycol ($\overline{M}_n$=1110), and 14.6 g of adipic acid together with 0.15 g of Irganox 1098. While introducing 200 ml of nitrogen, the charge is polymerized at 260° C. for 4 hours. During this period, the water content of the polymerizate was 0.4–0.2% by weight. After addition of 0.3 g of tetrabutyl orthotitanate, unreacted caprolactam is removed at 260° C. under reduced pressure. The residue is further polymerized for 2 hours under a pressure of 1 Torr to yield a transparent elastomer. This elastomer contained 46% by weight of polyoxytetramethylene glycol and showed a number average molecular weight of 1300 with respect to polyamide, relative viscosity of 1.85, melting point of 195°–206° C., tensile strength of 430 kg/cm², tensile elongation at break of 750%, Shore D hardness of 45, and cloudiness (haze value) of 51%. The elastomer is treated with a chloroform-methanol mixed solvent containing 75% by volume of chloroform. It is found that the soluble portion is 47% by weight and the polyamide partition ratio is 0.94.

EXAMPLE 20

Into the apparatus of Example 1, are charged 105 g of caprolactam, 161.5 g of the polyoxytetramethylene glycol (number average molecular weight of 4040) used in Example 6, 5.85 g of adipic acid, 0.5 g of manganese acetate, and 0.5 g of Irganox 1098. While introducing 30 ml/minute of nitrogen, the charge is polymerized at 220° C. for 2 hours, at 240° C. for 2 hours, and at 260° C. for 6 hours. During polymerization, the water content of the polymerizate is determined at regular time intervals and found to be 0.6 - 0.4% by weight. Unreacted caprolactam is removed by distillation at 260° C.

under reduced pressure to yield a transparent polyamide elastomer. This elastomer contained 80% by weight of polyoxytetramethylene glycol and showed a relative viscosity of 1.9, Shore hardness of 83 A, tensile strength of 360 kg/cm$^2$, tensile elongation at break of 950%, and cloudiness (haze value) of 30%. The polyamide partition ratio is 0.91 (soluble portion is 46% by weight) as determined with methanol containing 15% by volume of formic acid.

The uniform polyamide content, one of the features of the transparent elastomer obtained according to the present invention is illustrated more particularly in the following way. FIG. 1 represents the distribution of polyamide content of the elastomers of Example 4 and Comparative Example 2. The abscissa represents the polyamide content and the ordinate represents relative amounts of elastomer having the polyamide content.

As is apparent from the figure, the transparent elastomer of the present invention shows a single peak in the distribution of polyamide content, whereas there are two peaks in the distribution of polyamide content in the case of an elastomer prepared by the known method of direct condensation of a polycapramide having carboxyl end groups with a polyoxytetramethylene glycol, indicating that the elastomer is a mixture of an elastomer having a higher polyamide content and an elastomer of a lower polyamide content.

INDUSTRIAL APPLICABILITY

Contrary to the similar type elastomers obtained by the prior art, the polyamide elastomers of the polyether-ester-amide type according to the present invention have such desirable physical properties as flexibility, toughness and transparency and are useful and of industrial importance in the field where flexibility and transparency are needed, such as, for example, hoses, tubings, films, and sheetings.

We claim:

1. A polyamide elastomer having a relative viscosity of 1.5 or above in m-cresol (0.5 weight/volme %); at 30° C. , a polyamide partition ratio of from 0.7 to 1.3, a Shore hardness of 60 A to 50 D, a tensile strength of 150 kg/cm$^2$ or above, and a haze of 75% or below at a thickness of 1 mm, said elastomer having a structure of dehydration condensate produced from (A) a polycapramide having carboxyl end groups and a number average molecular weight of 500 to 5,000, which is derived from a dicarboxylic acid having 4 to 20 carbon atoms selected from aliphatic dicarboxylic acids, alicyclic dicarboxylic acids or aromatic dicarboxylic acid and caprolatam and (B) a polyoxytetramethylene glycol having a number average molecular weight of 800 to 5,000 or a modified polyoxytetramethylene glycol having a number average molecular weight of 800 to 5,000 and having, in the molecular chain, the units represented by the general formula

wherein R is a branched chain alkylene group having 4 to 20 carbon atoms or a straight chain alkylene group having 5 to 20 carbon atoms, the units content being 50% by weight or less and the weight ratio of the component (A) to the component (B) in the elastomer being from 10 : 90 to 60 : 40.

2. A polyamide elastomer according to claim 1, wherein the number average molecular weight of the polycapramide having carboxyl end groups is 800 to 3000.

3. A polyamide elastomer according to claim 1, wherein the molecular weight distribution of the polyoxy-tetramethylene glycol is 1.6 or below in terms of $\overline{M_{vis}}/\overline{M_n}$, wherein $\overline{M_n}$ is a number average molecular weight derived from the determination of hydroxyl value of the end group, $\overline{M_{vis}}$ is a viscosity average molecular weight defined by the formula $$\overline{M_{vis}} = \text{antilog}\,(0.493\,\log\eta + 3.0646)$$

and $\eta$ is a melt viscosity, in poise, at a temperature of 40° C. .

4. A polyamide elastomer according to claim 3, wherein the number average molecular weight of the polyoxytetramethylene glycol is 1500–4000.

5. A polyamide elastomer according to claim 3, wherein the number average molecular wieght of the polycapramide having carboxyl end groups is 800–3000 and the weight ratio of the component (A) to the component (B) is from 15 : 85 to 45 : 55.

6. A polyamide elastomer according to claim 1, wherein R of the modified polyoxytetramethylene glycol is one member selected from 1-methyl-1,3-propylene, 2-methyl-1,3-propylene, 2,2-dimethyl-1,3-propylene, 1-methyl-3-ethyl-1,3-propylene, 1,5-pentamethylene, 1,6-hexmethylene, or 1,8-octamethylene.

7. A polyamide elastomer according to claim 6, wherein R of the modified polyoxytetramethylene glycol is 2,2-dimethyl-1,3-propylene.

8. A polyamide elastomer according to claim 6, wherein R of the modified polyoxytetramethylene glycol is 1,6-hexamethylene.

9. A polyamide elastomer according to claim 6, wherein R of the modified polyoxytetramethylene glycol is 1,5-pentamethylene.

10. A polyamide elastomer according to claim 6, wherein the units content represented by the general formula $+\!\!-\!\!\text{O}\!-\!\text{R}\!-\!\!+\!\!$ included in the molecular chain of the modified polyoxytetramethylene glycol is 3–50% by weight.

11. A polyamide elastomer according to claim 1, wherein the dicarboxylic acid is one member selected from adipic acid, sebacic acid, azelaic acid, dodecanedioic acid, cyclohexanedicarboxylic acid, decalindicarboxylic acid, isophthalic acid, terephthalic acid, or naphthalenedicarboxylic acid.

12. A polyamide elastomer according to claim 11, wherein the dicarboxylic acid is adipic acid.

13. A polyamide elastomer according to claim 11, wherein the dicarboxylic acid is terephthalic acid.

14. A process for producing a polyamide polyamide comprising polymerizing of claim 1,
(A) caprolactam,
(B) a polyoxytetramethylene glycol having a number average molecular weight of 800–5,000 or a modified polyoxytetramethylene glycol having a number average molecular weight of 800–5,000, and having, in the molecular chain, the units represented by the general formula

i wherein R is a branched chain alkylene group having 4–20 carbon atoms or a straight chain alkylene group having 5–20 carbon atoms, the units content being 50% by weight or less, and
(C) a dicarboxylic acid selected from aliphatic dicarboxylic acids, alicyclic dicarboxylic acids, or aromatic dicarboxylic acids, the amount of (C) being substantially equivalent to the amount of (B) with respect to the hydroxyl group of (B) and the carboxyl group of (C),
at 150°-300° C. while maintaining the water content of the polymerizate within the range of 0.1-1% by weight, and then removing the unreacted caprolactam.

15. A process for producing a polyamide elastomer according to claim 14, wherein after the removal of unreacted caprolactam, the polymerization mixture is further subjected to post polymerization.

16. A process for producing a polyamide elastomer according to claim 14, wherein the polymerization is conducted in the presence of an esterification catalyst.

17. A process for producing a polyamide elastomer according to claim 15, wherein the post polymerization is conducted in the presence of an esterification catalyst.

18. A process for producing a polyamide elastomer according to claim 16, wherein the polymerization catalyst is phosphoric acid or a polyphosphoric acid.

19. A process for producing a polyamide elastomer according to claim 17, wherein the esterification catalyst is at last one member selected from phosphoric acid, polyphosphoric acids, tetraisopropyl orthotitanate, or tetrabutyl orthotitanate.

20. A process for producing a polyamide elastomer according to claim 14, 16 or 18, wherein the polymerization is conducted under an inert gas stream.

21. A process for producing a polyamide elastomer according to claim 14, 16 or 18, wherein the polymerization is conducted under a reduced pressure of 150-600 mmHg.

22. A process for producing a polyamide elastomer according to claim 15, 17 or 19, wherein the post polymerization is conducted uder a vacuum of 5 mmHg or below.

23. A process for producing a polyamide elastomer of claim 1 wherein,
(A) a polycapramide having average molecular weight of 300-4,000 and having carboxyl groups at both end, which is obtained by the reaction between caprolactam and a dicarboxylic acid selected from aliphatic dicarboxylic acids, alicyclic dicarboxylic acids, or aromatic dicarboxylic acids,
(B) a polyoxytetramethylene glycol having a number average molecular weight of 800-5,000 or a modifed polyoxytetramethylene glycol having a number average molecular weight of 800-5,000 and having, in the molecular chain, the units represented by the general formula $$+O-R+$$

wherein R is a branched chain alkylene group having 4-20 carbon atoms or a straight chain alkylene group having 5-20 carbon atoms, the units content being 50% by weight or less, and
(C) caprolactam in an amount of at least 0.7, times the weight of said polycapramide,
which are in such interrelationship that the amount of (A) and the amount of (B) are substantailly equivalent with respect to the carboxyl group of (A) and the hydroxyl group of (B), are polymerized at 150°-300° C. while removing the water formed, and then removing the unreacted caprolactam.

24. A process for producing a polyamide elastomer according to claim 22, wherein after the removal of unreacted caprolaactam the polymerization mixture is subjected to post polymerization at 200°-300° C.

25. A process for producing a polyamide elastomer according to claim 23, wherein the polymerization is conducted under an inert gas stream.

26. A process for producing a polyamide elastomer according to claim 23, wherein the polymerization is conducted under a reduced pressure of 150-600 mmHg.

27. A process for producing a polyamide elastomer according to claim 23, wherein the post polymerization is conducted under a vacuum of 5 mmHg or below.

28. A process for producing a polyamide elastomer according to claim 23, 25 or 26, wherein the polymerization is conducted in the presence of an esterification catalyst.

29. A process for producing a polyamide elastomer according to claim 24 or 27, wherein the post polymerization is conducted in the presence of an esterification catlayst.

30. A process for producing a polyamide elastomer according to claim 28, wherein the esterification catalyst is phosphoric acid or a polyphosphoric acid.

31. A process for producing a polyamide elastomer according to claim 29, wherein the esterification catalyst is at least one member selected from phosphoric acid, polyphosphoric acids, tetraisopropyl orthotitanate or tetrabutyl orthotitanate.

* * * * *